United States Patent [19]

Eguchi

[11] Patent Number: 5,498,762
[45] Date of Patent: Mar. 12, 1996

[54] FERROELECTRIC LIQUID CRYSTAL DEVICE

[75] Inventor: Ken Eguchi, Yokohama, Japan

[73] Assignee: Canon Kabushiki Kaisha, Tokyo, Japan

[21] Appl. No.: 442,987

[22] Filed: May 17, 1995

Related U.S. Application Data

[63] Continuation of Ser. No. 296,930, Aug. 31, 1994, abandoned.

[30] Foreign Application Priority Data

Aug. 31, 1993 [JP] Japan .................................. 5-237211

[51] Int. Cl.⁶ .................................................. G02F 1/1337
[52] U.S. Cl. .................................. 428/1; 359/75; 359/76
[58] Field of Search ..................... 428/1, 212; 359/75–78

[56] References Cited

U.S. PATENT DOCUMENTS

| | | | |
|---|---|---|---|
| 4,367,924 | 1/1983 | Clark et al. | 350/334 |
| 4,561,726 | 12/1985 | Gooby et al. | 350/341 |
| 4,655,561 | 4/1987 | Kanbe et al. | 350/350 S |
| 5,009,489 | 4/1991 | Eguchi et al. | 350/341 |
| 5,046,822 | 9/1991 | Matsuda et al. | 359/75 |
| 5,239,398 | 8/1993 | Yanagisawa et al. | 359/76 |

FOREIGN PATENT DOCUMENTS

| | | |
|---|---|---|
| 56-107216 | 8/1981 | Japan. |
| 59-193427 | 11/1984 | Japan. |

*Primary Examiner*—Alexander S. Thomas
*Attorney, Agent, or Firm*—Fitzpatrick, Cella, Harper & Scinto

[57] ABSTRACT

A ferroelectric liquid crystal device is constituted by a pair of substrates each having thereon an electrode and an alignment film, and a ferroelectric liquid crystal disposed between the substrates. The alignment film on at least one substrate comprises laminated layers of at least two species of electroconductive polymers having mutually different optical band gaps $Eq^{opt}$. The ferroelectric liquid crystal device can effectively remove undesirable reverse electric field effect even when a liquid crystal having a large spontaneous polarization is used, and exhibits little change in threshold characteristic with time.

25 Claims, 8 Drawing Sheets

FERROELECTRIC LIQUID CRYSTAL DEVICE

This application is a continuation of application Ser. No. 08/296,930, filed Aug. 31, 1994, now abandoned.

FIELD OF THE INVENTION AND RELATED ART

This invention relates to a liquid crystal device to be used in a liquid crystal display device, a liquid crystal-optical shutter, etc., particularly a liquid crystal device using a specific electroconductive alignment film.

TV images are motion pictures highly defined and having halftones. Display of such TV images requires the highest level of display technologies satisfying high resolution, high-speed responsiveness, multi-level gradation display, high contrast, high-reliability and color image formation. In these respects, TV images displayed on a CRT are very excellent in quality. However, along with a trend of desiring larger display areas, liquid crystal display apparatus capable of retaining a light weight have called attention, and extensive research has been made recently on TV image display methods using an active matrix-type liquid crystal display device wherein nematic liquid crystal is directly driven by a switching element disposed at each pixel. As the switching element, a TFT (thin film transistor) has been considered most suitable, but it provides a great difficulty in application to a larger area device because of complicated production process and a large number of steps involved therein.

On the other hand, a display device of the type which controls transmission of light in combination with a polarizing device by utilizing the refractive index anisotropy of ferroelectric liquid crystal molecules has been proposed by Clark and Lagerwall (Japanese Laid-Open Patent Application (JP-A) 56-107216, U.S. Pat. No. 4,367,924). The ferroelectric liquid crystal has generally chiral smectic C phase (SmC*) or H phase (SmH*) of a non-helical structure and, in the SmC* or SmH* phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display according to a simple matrix drive scheme in view of its function.

A ferroelectric liquid crystal device is driven according to an essentially binary display scheme based on control between bistable two states of the liquid crystal and accordingly has been considered unsuitable for halftone display. However, along with development of gradation display technique for ferroelectric liquid crystal, it is expected to apply the liquid crystal to a wider scope of application utilizing the excellent properties thereof. As a gradation display method according to a simple matrix drive scheme, there has been proposed an area gradation method wherein transition between two bistable alignment states is controlled microscopically within a pixel to form minute domains within the pixel (Japanese Laid-Open Patent Application (JP-A) 59-193427). However, according to the alignment control technique proposed heretofore, it has been difficult to stably and sufficiently control the above-mentioned minute domains. It has been also difficult to provide a sufficiently increased contrast between the bistable two states and sufficiently remove the after-image or hysteresis phenomenon in the course of switching so that it has been difficult to realize practically feasible gradation display.

For an optical modulating device using a ferroelectric liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta \cdot \sin^2 (\Delta n d/\lambda),$$

wherein $I_0$: incident light intensity, $I$: transmitted light intensity, $\theta$: tilt angle, $\Delta n$: refractive index anisotropy, $d$: thickness of the liquid crystal layer, $\lambda$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle $\theta$ in a non-helical structure for realizing bistability should desirably be as close as possible to 22.5 degrees in order to provide a high transmittance and a high contrast.

A method for aligning a ferroelectric liquid crystal should desirably be such that molecular layers each composed of a plurality of molecules of a smectic liquid crystal are aligned uniaxially along their normals, and according a polyimide film subjected to rubbing has been widely used. As an alignment method for a ferroelectric liquid crystal, particularly a chiral smectic liquid crystal in a non-helical structure, one disclosed in U.S. Pat. No. 4,561,726 has been known for example.

However, a tilt angle $\theta$ (an angle shown in FIG. 3 as described below) in a ferroelectric liquid crystal with a non-helical structure obtained by alignment with a rubbed polyimide film is generally smaller as compared with a tilt angle Ⓗ (the angle Ⓗ is a half of the apex angle of the cone shown in FIG. 2 as described below) in the ferroelectric liquid crystal having a helical structure. Particularly, the tilt angle $\theta$ in a ferroelectric liquid crystal with a non-helical structure obtained by alignment with a rubbed polyimide film was generally on the order of 3–8 degrees, and the transmittance at that time was at most about 3 to 5%.

Figure 4:
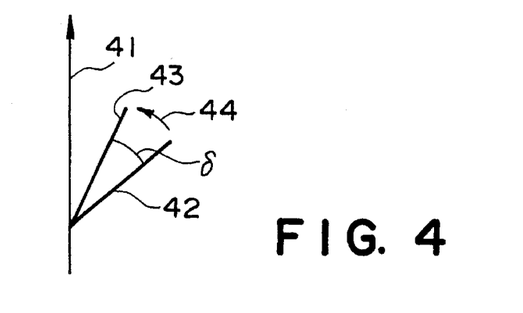
FIG. 4 illustrates a relationship between a uniaxial alignment axis provided to the substrates and liquid crystal molecular axes adjacent to the substrates of a ferroelectric liquid crystal.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle $\theta$ in a non-helical structure is smaller than the tilt angle Ⓗ in a helical structure. It has been also clarified that such a smaller angle $\theta$ in a non-helical structure is attributable to a twist alignment of liquid crystal molecules. More specifically, in a ferroelectric liquid crystal of a non-helical structure, molecular axes 42 and 43 adjacent to upper and lower substrates provided with a uniaxial alignment axis 41 given by rubbing or oblique vapor deposition are twisted continuously at a twist angle δ with respect to a normal to the substrates in a twist direction 44 as shown in FIG. 4. This causes the tilt angle θ in the non-helical structure to be smaller than the tilt angle Ⓗ in the helical structure.

Further, in an alignment state of a chiral smectic liquid crystal attained by a conventional polyimide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev due to the presence of the polyimide film as an insulating layer between the electrode and the liquid crystal layer, and the reverse electric field Vrev has caused an after-image during display (as reported in "Switching characteristic of SSFLC" by Akio Yoshida, "Preprint for Liquid Crystal Forum, October 1987" p.p. 142–143). Further, there is also caused a problem of hysteresis in switching due to charge accumulation with ion species, etc.

It has been known to use an electroconductivity-imparted alignment film in order to solve the above-mentioned problem. In order to impart an electroconductivity to a polymer used as an alignment control film, it is necessary to dope the polymer with a chemically active compound. Accordingly, the resultant electroconductive alignment film contains some ionic dopant.

In order to realize a high-speed switching applicable to a motion picture display, it is necessary to increase the switching speed of a ferroelectric liquid crystal by increasing the spontaneous polarization Ps of the ferroelectric liquid crystal. In this case, however, the reverse electric field is also increased due to a larger spontaneous polarization, and also ions are liable to be localized in the alignment film. Further, a sufficiently large alignment film thickness is desired in order to provide a stable alignment characteristic but an increase in alignment film thickness is considered to promote the localization of ions in the alignment film, so that the after-image or hysteresis in the switching process cannot be sufficiently removed.

SUMMARY OF THE INVENTION

In view of the above-mentioned problems in alignment of a ferroelectric liquid crystal, an object of the present invention is to provide a ferroelectric liquid crystal device with an increased contrast ratio between the bistable states and having removed the after-image or hysteresis in the switching process.

According to the present invention, there is provided a ferroelectric liquid crystal device, comprising: a pair of substrates each having thereon an electrode and an alignment film, and a ferroelectric liquid crystal disposed between the substrates; wherein the alignment film on at least one substrate comprises laminated layers of at least two species of electroconductive polymers having mutually different optical band gaps $Eq^{opt}$.

According to the liquid crystal device of the present invention, due to the characteristic performance of the alignment film, it is possible to increase the contrast and suppress the after-image and the hysteresis. Particularly, when used as a display device, the display quality is improved, and excellent motion picture display can be performed.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 7(a) is a sectional view showing a charge distribution, FIG. 7(b) is a sectional view showing a direction of a spontaneous polarization $P_S$ and FIG. 7(c) is a sectional view showing a direction of a reverse electric field Vrev.

DETAILED DESCRIPTION OF THE INVENTION

Figure 1:
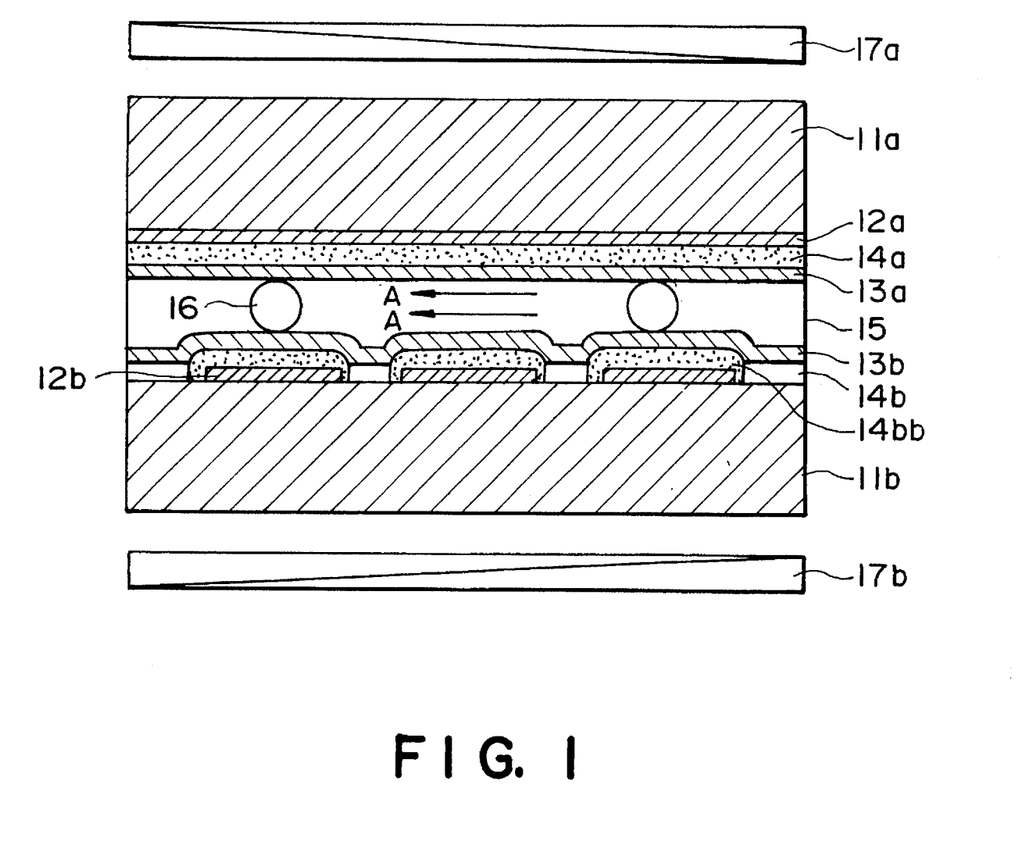
FIG. 1 is a schematic sectional view of an embodiment of the liquid crystal device according to the present invention.

FIG. 1 is a schematic sectional view of an embodiment of the liquid crystal device according to the present invention.

The liquid crystal device comprises a pair of substrates (glass plates) 11a and 11b which are coated with transparent electrodes 12a and 12b of $In_2O_3$, ITO (indium tin oxide), etc. In this instance, the transparent electrodes 12a and 12b may be arranged to form a simple matrix electrode structure. The transparent electrodes 12a and 12b are respectively coated with two layers of 13a and 14a, or 13b and 14b, of mutually different species of electroconductive polymers. The alignment films can be formed as a lamination of three or more layers according to necessity in view of the required properties of the device.

Between the uppermost alignment films 13a and 13b, a ferroelectric smectic liquid crystal 15 is disposed, and the spacing therebetween is set to provide the liquid crystal layer 15 with a thickness of, e.g., 0.1–3 µm, which is sufficiently small to suppress the formation of a helical structure of the ferroelectric smectic liquid crystal 15 by disposing spacer beads of, e.g., silica, alumina, etc., between the alignment films 13a and 13b, whereby the ferroelectric smectic liquid crystal assumes a bistable alignment state. The thus formed cell structure is sandwiched between a pair of polarizers 17a and 17b arranged in cross nicols.

The liquid crystal device of the present invention is most characterized by the use of at least two species of electroconductive polymers having mutually different optical band gaps $Eq^{opt}$ for the alignment films 13a, 14a and so forth (and also for the alignment film 13b, 14b, and so forth as desired).

Examples of the electroconductive polymers may include polypyrrole, polythiophene and polyaniline, and derivative of these including those represented by the following recurring units, respectively:

wherein X denotes —COR and R denotes —$C_nH_{2n+1}$ (n=0–12); polyarylenevinylene (such as polyphenylenevinylene) and derivatives thereof, polythienylenevinylene, polyisothianaphthene, poly(phenylene-2,5-diyl), poly(pyridine-2,5-diyl), poly(2,2'-bipyridine- 5,5-diyl), and poly(pyridine-5,2-diyl-thiophene-2,5-diyl).

The alignment film comprising electroconductive polymers may preferably have a conductivity of at least $10^{-10}$ S/cm, more preferably at least $10^{-8}$ S/cm, and a higher conductivity is preferred in order to reduce the reverse electric field effect. On the other hand, in a liquid crystal cell having a simple matrix of transparent electrodes, it is necessary to ensure a resistivity of at least $10^4$ ohm.cm of the alignment film between the adjacent pixels in order to avoid a crosstalk between pixels. Accordingly, it is preferred to provide portions on the electrodes of the alignment film locally selectively with a conductivity of at least $10^{-4}$ S/cm.

Hereinbelow, the alignment film used in the present invention will be described in more detail.

In a π electron-conjugated polymer, a band structure is formed by overlapping of π electron clouds along the main chain and can contribute to development of electroconductivity. The electroconductive polymers described above have a band gap corresponding to an optical absorption edge in the visible or near infrared region which is similar to the band gap of an intrinsic semiconductor. In the case of a π electron-conjugated polymer, however, the band gap depends on the size of the conjugated system thus formed, so that it is convenient to use an optical band gap expressed in terms of an energy corresponding to the above-mentioned optical absorption edge. However, such a π electron-conjugated polymer alone has no carriers and is therefore basically an insulating material, so that it is necessary to form carriers by oxidizing or reducing the π electron-conjugated system in order to impart a conductivity. The process is referred to as "doping" and, as a result of the doping, a new energy level is formed in the band gap, so that generated carriers are relaxed to the energy level to show an electroconductivity.

The above-mentioned polymers generally have a carbon skeleton, and their Fermi levels are not remarkably different depending on the polymer species. Accordingly, when two materials (which may have different skeletons or identical skeletons having different side groups) having different band gaps are laminated, a simple junction boundary free from a remarkable bending in band structure is believed to be formed. In such a case, the carriers formed by doping are relaxed within a polymer having a smaller band gap. Accompanying therewith, it is considered that the dopants are localized in the polymer having a smaller band gap and the diffusion into the polymer having a larger band gap becomes difficult.

On the other hand, when a two-layer alignment film is supplied with a high voltage with its doped electroconductive polymer having a smaller band gap disposed on the electrode side, the carriers of electrons or holes can more easily move between the layers having different band gaps through the junction boundary within the band formed in the alignment film compared with the dopant. Further, when the voltage is turned off, charge accumulation does not readily occur at the junction boundary. Particularly, at the time of switching of a ferroelectric liquid crystal, the potential change at the alignment film/liquid crystal boundary accompanying the inversion of spontaneous polarization can be relaxed by the movement of electrons or holes in the alignment film.

Dopant compounds for imparting an electroconductivity to an electroconductive polymer to provide an elevated carrier density may generally be ionic low-molecular compounds. Examples of such dopants may include halogens, boron tetrafluoride, oxide anion sources, such as perchloric acid, sulfuric acid, and nitric acid. It is also possible to use alkali metals.

On the other hand, an electroconductive polymer film as described above may be ionically doped by electrolysis, whereby portions of an alignment film above the electrodes can be locally selectively doped to have a high conductivity. For example, the alignment film 14b in the above embodiment is provided with portions 14bb of an enhanced conductivity in this way schematically as shown in FIG. 1. The electrolysis may be performed in a conventional manner by applying a voltage to the electrodes of a substrate covered with an alignment film in an electrolytic organic solution containing a prescribed species of ions. However, the localized doping may be performed through a method other than electrolysis.

The doping may preferably be performed after the formation of a lower (second) alignment film layer and before the formation of an upper (first) alignment film layer.

In the laminated alignment films of electroconductive polymers used in the present invention, it is preferred that a first electroconductive polymer layer (13a, 13b in FIG. 1) disposed in contact with the liquid crystal has an $Eq^{opt}$ which is larger than that of a second electroconductive polymer layer (14a, 14b in FIG. 1). In this instance, the resultant liquid crystal device may be provided with a stable drive characteristic with a smaller change with time in switching threshold.

The optical band gap $Eq^{opt}$ of a polymer film may be calculated from the temperature-dependence of the absorption coefficient of the film obtained by measuring the absorption coefficient at several temperatures by a microscopic spectrophotometry. The difference in $Eq^{opt}$ between the first and second polymer layers may preferably be at least 0.3 eV, more preferably at least 0.5 eV.

Further, in view of the fact that the liquid crystal is typically used as a display device, the alignment film may preferably comprise a material having a good transparency with respect to light of the visible range. Accordingly, the alignment film may generally have a thickness in the range of 30–500 Å, preferably 30–200 Å, more preferably 30–100 Å. The alignment film may be formed in a conventional manner. In order to provide the alignment film with a more effective alignment characteristic, the alignment film may preferably be subjected to a uniaxial aligning treatment, preferably rubbing. The rubbing may be applied to each alignment film in one direction, and the rubbing directions applied to the pair of substrates may be parallel or antiparallel to each other or may cross each other with a small intersection angle. This may be varied depending on the alignment characteristic of a ferroelectric liquid crystal material used. Further, the rubbing per se may be performed in a conventional manner.

In order to promote the smooth movement of charges generated on the alignment film surface, the layer (13a, 13b in FIG. 1) in contact with the liquid crystal of the alignment film may preferably have a smaller thickness than the other alignment film layers and particularly a thickness of at most 50 Å.

The liquid crystal material used in the liquid crystal device of the present invention may generally comprise a mixture including at least one mesomorphic compound, but the composition thereof is not basically limited. In view of the easiness of homogeneous alignment characteristic at the initial stage after the liquid crystal injection, it is preferred to use a liquid crystal material showing a phase transition from series including successively isotropic phase, cholesteric phase, smectic A phase and chiral smectic C phase in the course of temperature decrease. Particularly, a chiral smectic liquid crystal showing a helical pitch of at least 0.8 µm in cholesteric phase (measured at a mid temperature in the cholesteric range) is preferred.

However, the applicability of the alignment film used in the liquid crystal device of the present invention is not restricted to the above-mentioned liquid crystal. Particularly, the alignment film is suitably used as a ferroelectric liquid crystal having a large spontaneous polarization in which a polarization field of space charge, i.e., spatial dispersion of spontaneous polarization of liquid crystal molecules, substantially affects the molecular alignment of the liquid crystal, in order to provide a switching process with improved stability and reproducibility. For example, the alignment film can be satisfactorily applied to a ferroelectric liquid crystal having a spontaneous polarization of at least 10 nC/cm$^2$ and/or a transition series including no cholesteric phase in the course of temperature decrease, and further a ferroelectric liquid crystal having a helical pitch in SmC* phase (typically at 30° C.) of 0.5 µm or shorter, while the initial homogeneous alignment after the liquid crystal injection becomes somewhat difficult. Particularly, the alignment film may suitably be used in combination with a liquid crystal material having a Ps of at least 10 nC/cm$^2$ so as to remove the reverse electric field effect and reduce the shift of threshold value liable to be caused after a long term of drive. In this instance, it is sometimes effective to apply an AC electric field to the ferroelectric liquid crystal in order to provide an improved initial alignment state.

Figure 2:
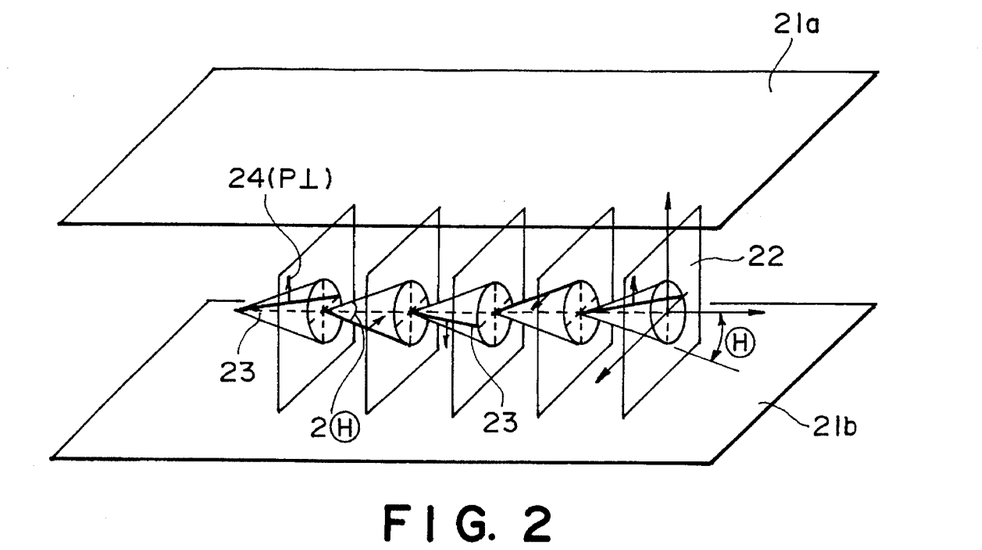
FIG. 2 is a perspective view showing schematically an alignment of a chiral smectic liquid crystal having a helical structure.

FIG. 2 is a schematic illustration of a ferroelectric liquid crystal cell (device) for explaining operation thereof. Reference numerals 21a and 21b denote substrates (glass plates) on which a transparent electrode of, e.g., In$_2$O$_3$, SnO$_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. A half of the apex angle of a helical cone in this state is a tilt angle H in chiral smectic phase of such a helical structure.

When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
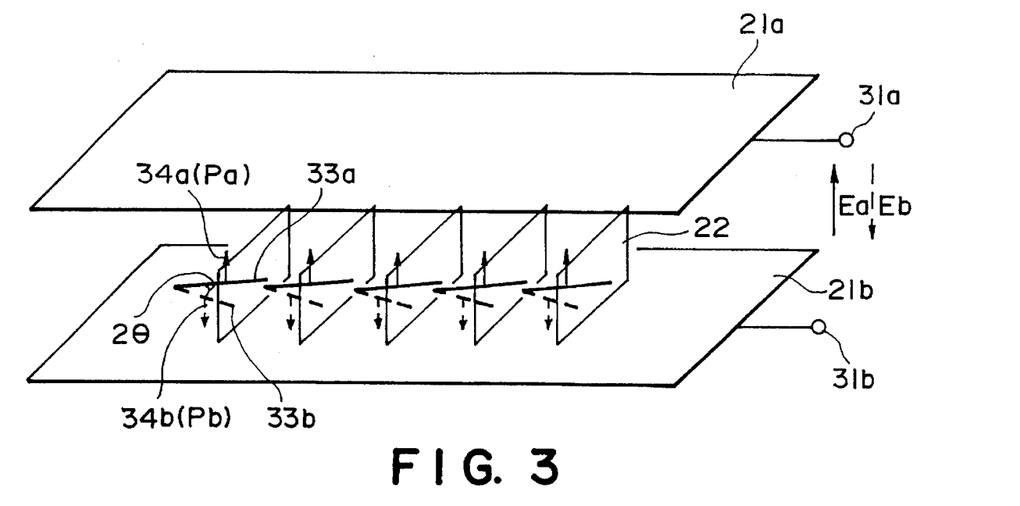
FIG. 3 is a perspective view showing schematically an alignment state of a chiral smectic liquid crystal having a non-helical structure.

Further, when the liquid crystal cell is made sufficiently thin (e.g., 0.1–3 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics by voltage application means 31a and 31b, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

A first advantage attained by using such a ferroelectric liquid crystal cell is that the response speed is quite fast, and a second advantage is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

Figure 5A:
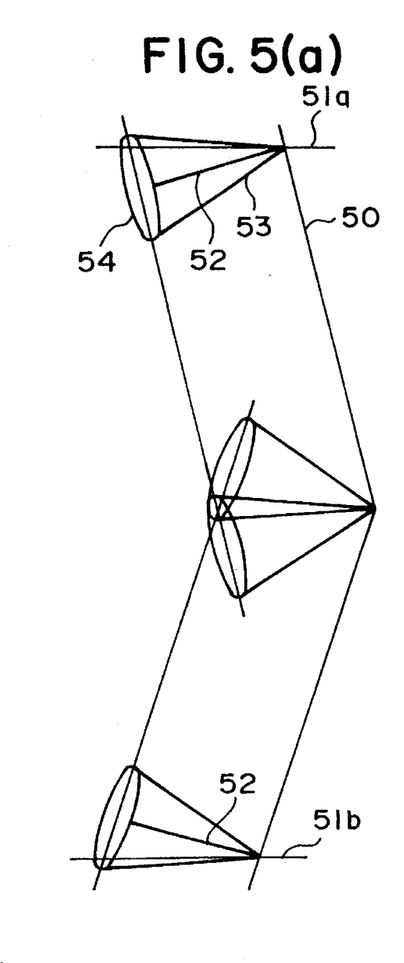
FIG. 5(a) is a schematic sectional view showing an alignment state of a chiral smectic liquid crystal aligned according to the present invention.
Figure 5B:
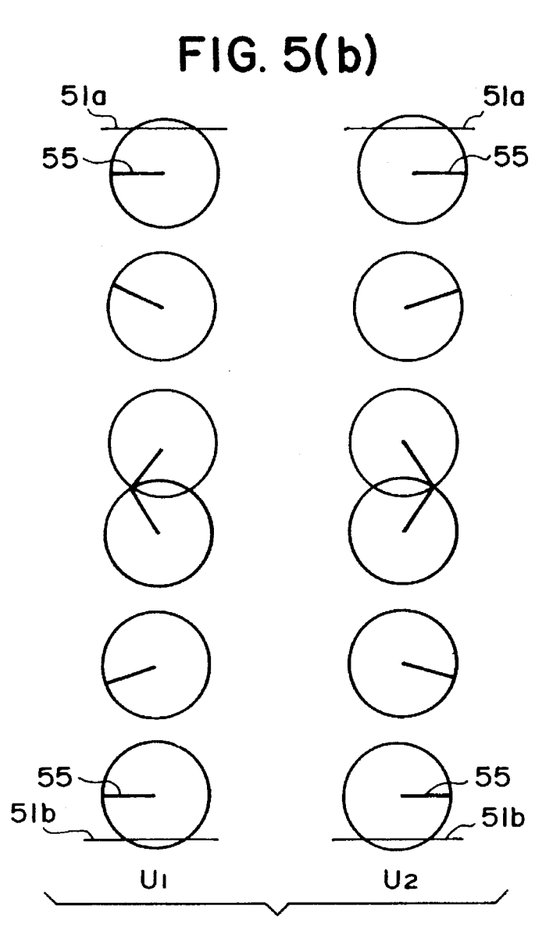
FIG. 5(b) is an illustration of C-director alignments in a uniform alignment state.

FIG. 5(a) is a schematic sectional view showing an alignment state of liquid crystal molecules attained by the present invention, and FIG. 5(b) is a view showing alignment of corresponding C-directors. Reference numerals 51a and 51b in FIG. 5(a) denote upper and lower substrates, respectively. Numeral 50 denotes a molecular layer composed of liquid crystal molecules 52, and liquid crystal molecules 52 are aligned so as to change their positions along the bottom face 54 (circular) of a cone 54. FIG. 5(b) more specifically shows a change in C-directors. Referring to FIG. 5(b), at U$_1$ are shown C-directors 55 (each being a projection of a molecular long axis onto an imaginary plane perpendicular to the normal to a molecular layer 50) in one stable orientation state, and at U$_2$ are shown C-directors 55 in the other stable orientation state.

Figure 5C:
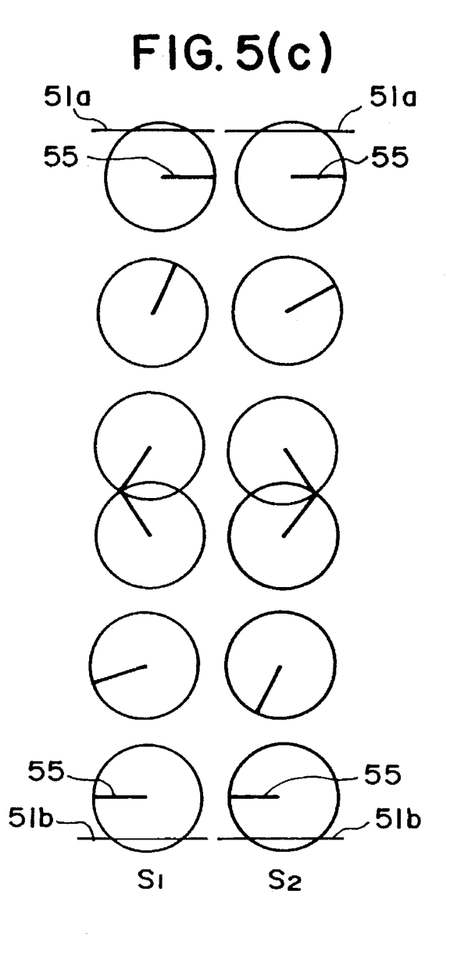
FIG. 5(c) is an illustration of C-director alignments in a splay alignment state.

On the other hand, an alignment state attained by a rubbing-treated polyimide film may be represented by a C-director diagram of FIG. 5(c), which shows an alignment state wherein molecular axes are twisted in a large degree from the upper substrate 51a to the lower substrate 51b to provide a smaller tilt angle θ.

Figure 6A:
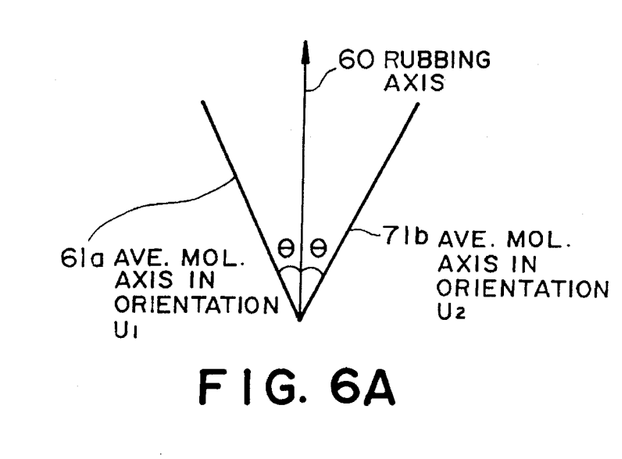
FIGS. 6A and 6B are plan views illustrating tilt angles θ in a uniform alignment state and a splay alignment state, respectively.
Figure 6B:
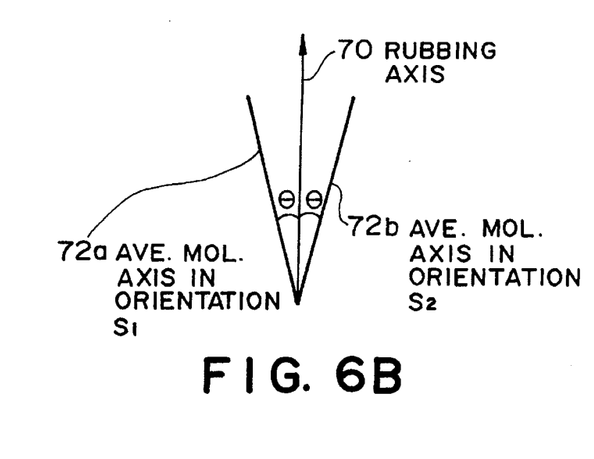

FIG. 6A is a schematic plan view illustrating a tilt angle θ in an alignment state where C-directors 55 assume a state shown in FIG. 5(b) (referred to as "uniform alignment state"), and FIG. 6B is a schematic plan view illustrating a tilt angle θ in an alignment state where C-directors 55 assume a state shown in FIG. 5(c) (referred to as "splay alignment state"). In these figures, reference numeral 60 denotes a direction of withdrawing a substrate for forming an alignment film on the substrate by the LB Langmuir-Blodget technique or a uniaxial alignment axis provided by rubbing onto an alignment film formed by coating or vapor deposition, numeral 61a denotes an average molecular axis in the orientation state $U_1$, numeral 61b denotes an average molecular axis in the orientation state $U_2$, numeral 62a denotes an average molecular axis in the orientation state $S_1$, and numeral 62b denotes an average molecular axis in the orientation state $S_2$. The average molecular axes 61a and 61b can be switched to each other by applying voltages of mutually opposite polarities. Similar switching is caused between the average molecular axes 62a and 62b.

Next, the effectiveness of the uniform alignment state with respect to a delay in optical response (after-image) due to a reverse electric field Vrev is explained. If the capacitance of an insulating layer constituting a liquid crystal cell is denoted by Ci, the capacitance of a liquid crystal layer is denoted by CLC and the spontaneous polarization of the liquid crystal is denoted by $P_S$, Vrev causing after-image is expressed by the following equation.

$$Vrev=2P_S/(Ci+C_{LC})$$

Figures 7, 8:
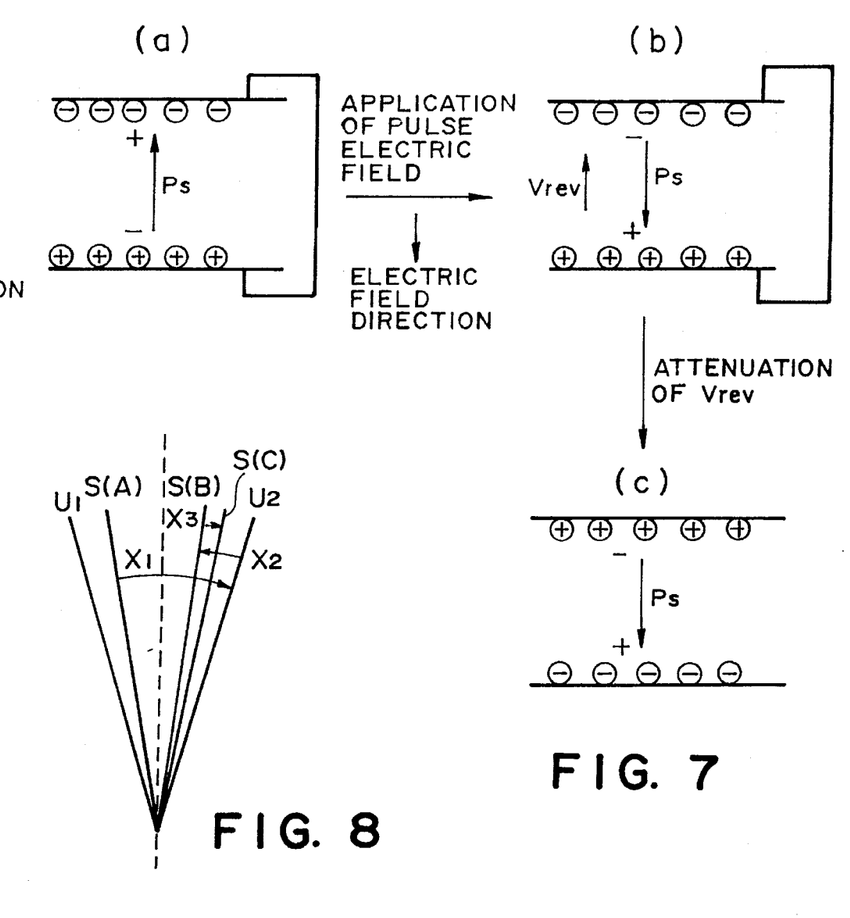
FIG. 8 is a schematic plan view illustrating changes in tilt angle θ during and after application of an electric field.

FIG. 7 is a schematic sectional view illustrating changes in charge distribution direction of $P_S$ and direction of the reverse electric field in a liquid crystal cell. At FIG. 7(a), there is shown a distribution of ⊕ and ⊖ charges in a memory state before application of a pulse electric field, where the spontaneous polarization is directed from ⊕ charges to ⊖ charges. At FIG. 7(b) is shown a state immediately after removal of a pulse electric field, when the direction of the spontaneous polarization $P_S$ is opposite to that shown at FIG. 7(a) (thus, the liquid crystal molecules are inverted from one stable orientation state to the other orientation state) but the distribution of the ⊕ and ⊖ charges is similar to that shown at FIG. 7(a), so that a reverse electric field Vrev is generated as indicated by an arrow shown at FIG. 7(b). The reverse electric field Vrev disappears in a short time to provide a distribution of ⊕ and ⊖ charges as shown at FIG. 7(c).

Figure 9:
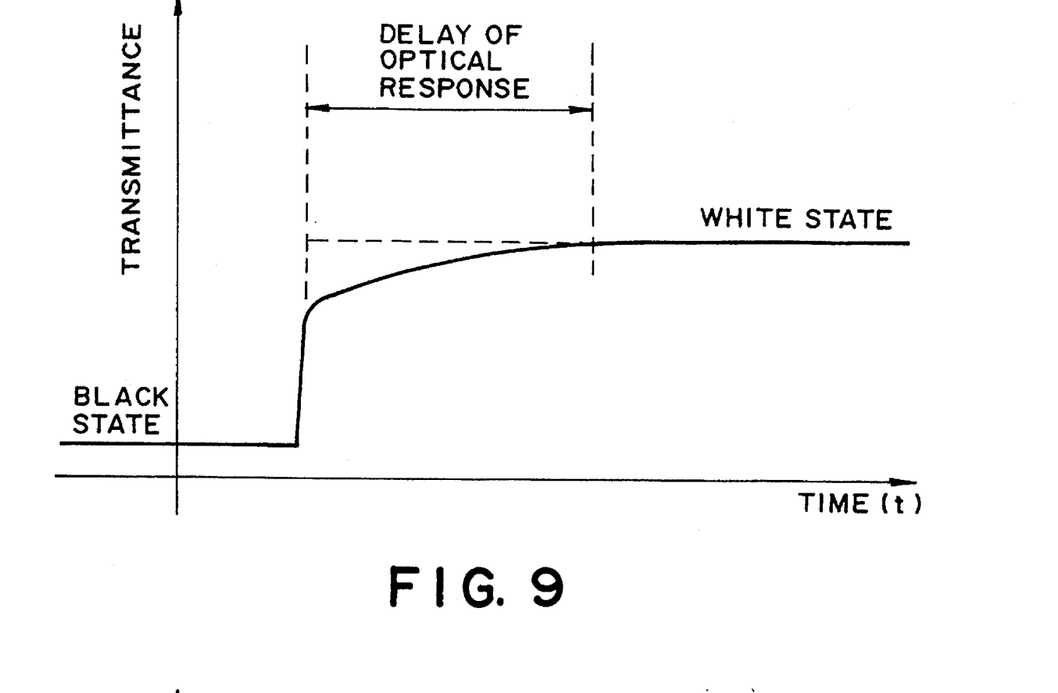
FIGS. 9 and 10 are graphs showing optical response characteristics according to a conventional device and the present invention, respectively.

FIG. 8 is a plan view showing a change in optical response in a splay alignment state given by a conventional polyimide alignment film in terms of a change in tilt angle θ. Referring to FIG. 8, at the time of application of a pulse electric field, the orientation of liquid crystal molecules is changed from an average molecular axis S(A) in a splay alignment state to be overshot to an average molecular axis $U_2$ in a uniform alignment state close to that providing a maximum tilt angle Ⓗ along a path denoted by an arrow $X_1$, and immediately after the removal of the pulse electric field, the orientation is changed along a path denoted by an arrow $X_2$ to an average molecular axis S(B) in a splay alignment state providing a decreased tilt angle θ due to the action of the reverse electric field Vrev shown at FIG. 7(b). Then, as the reverse electric field Vrev attenuates as shown at FIG. 7(c), the orientation is changed along a path denoted by an arrow $X_3$ to an average molecular axis S(C) in a splay alignment state providing a stable orientation state having a somewhat increased tilt angle θ. The resultant optical response in this case is shown in FIG. 9.

Figure 10:
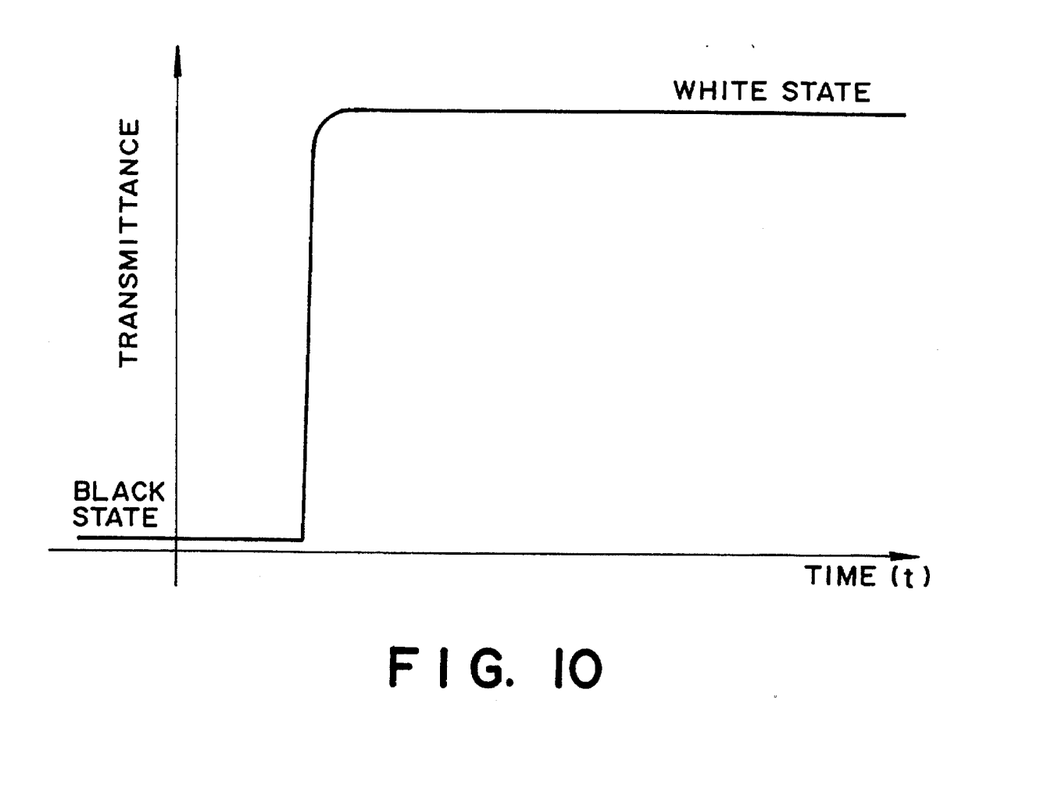
Figure 12:
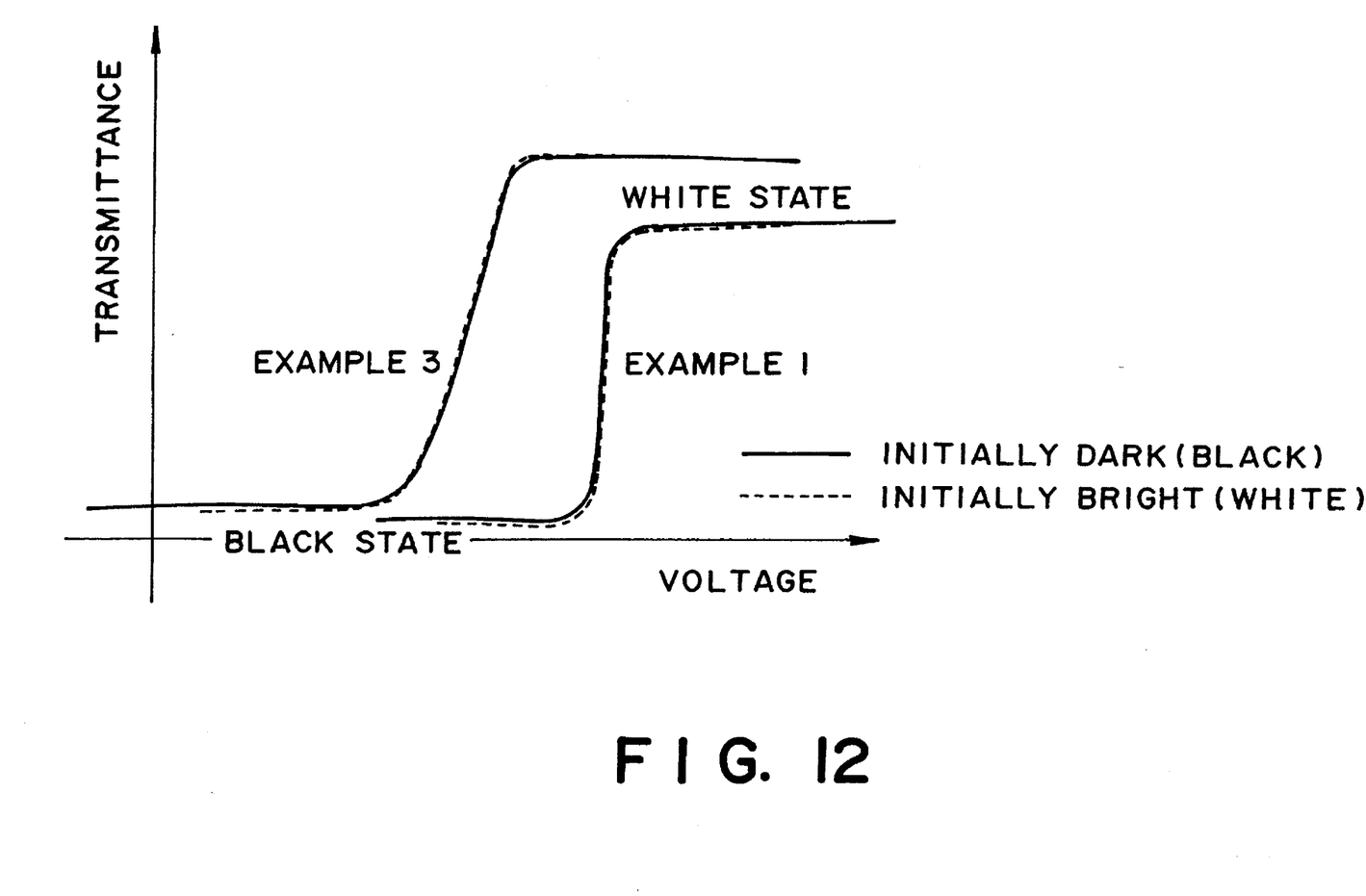
FIG. 12 is a graph showing transmittance-voltage characteristics of liquid crystal devices according to the invention.

In the alignment state given by using the above-mentioned electroconductive alignment layer of the present invention, the average molecular axes S(A), S(B) and S(C) in the splay alignment state shown in FIG. 8 are not caused but it is possible to form an alignment state with an average molecular axis giving a tilt angle θ which is close to a maximum tilt angle Ⓗ. An optical response at this time according to the present invention is shown in FIG. 10. FIG. 10 shows that a delay in optical response causing after-image as observed in a conventional liquid crystal device as shown in FIG. 9 is obviated and a high contrast in memory states is caused. This will be specifically described with reference to FIG. 12 showing the results of Examples 1 and 3 appearing hereinafter.

In the ferroelectric liquid crystal device of the present invention, as will be clearly demonstrated in Examples appearing hereinafter, an electroconductive alignment film comprising laminated layers of at least two electroconductive polymers having different optical band gaps $Eq^{opt}$ is used, thereby to solve the problems, such as hysteresis at the time of switching, considered to be attributable to localization of dopant ions in the alignment film, provide an improved contrast ratio between bistable two states and solve the after-image problem in the switching process. Particularly, it has become possible to realize an alignment state free from hysteresis in V-T characteristic even in a device using a ferroelectric liquid crystal having a large spontaneous polarization (of, e.g., at least 10 nC/cm$^2$).

When the ferroelectric liquid crystal device is applied to a multiplexing drive scheme as disclosed in U.S. Pat. No. 4,655,561, it is possible to realize an alignment state which provides a large contrast between selected and non-selected pixels and is free from a delay in optical response leading to an after-image during display.

Hereinbelow, the present invention will be described more specifically based on Examples.

EXAMPLE 1

Two 1.1 mm-thick glass plates each provided with 1500 Å-thick ITO stripe electrodes were respectively coated with a solution of polyaniline (PAn) in N-methylpyrrolidone filtered for removal of impurities by spin coating at 1500 rpm for 15 sec. to form a 80 Å-thick PAn film ($Eq^{opt}$=ca. 1.5 eV). The PAn on the substrate was then dipped in a 1N-aqueous sulfuric acid solution for doping and dried at 65° C. for several hours to provide a conductivity of ca. $10^{-4}$ S/cm.

Then, the electroconductive polymer film thus formed was further coated with poly(phenylene-2,5-diyl) (PPP, $Eq^{opt}$=ca. 2.5 eV or higher) by oblique evaporation at a deposition angle of 15 degrees (i.e., the evaporation axis formed an angle of 75 degrees from the substrate normal) by resistance heating under a vacuum (of $10^{-7}$ Torr), thereby to form an alignment film in a total thickness of 19 nm.

Then, the alignment film was rubbed in one direction substantially parallel to the evaporation axis direction under the conditions of a rubbing yarn pressing depth of 0.4 mm, a rubbing roller rotation speed of 1000 rpm and a substrate feed speed of 12 mm/sec. to form a treated alignment film.

Then, on one of the two substrates each provided with the treated alignment film, 1.5 μm-dia. alumina beads were dispersed, and the other substrate was superposed thereon so that their rubbing axes were parallel and identical to each other to form a blank cell (panel).

The blank cell was filled with a biphenyl ester-based ferroelectric liquid crystal ("CS-1014" (trade name), available from Chisso K.K.) under vacuum and, after sealing, was gradually cooled from isotropic phase at a rate of 0.5° C./hr. to 30° C., whereby an alignment was effected. The "CS-1014" liquid crystal in the cell showed the following phase transition series.

Iso.: isotropic phase,
Ch.: cholesteric phase,
SmA: smectic A phase,
SmC*: chiral smectic C phase.

Figure 13:
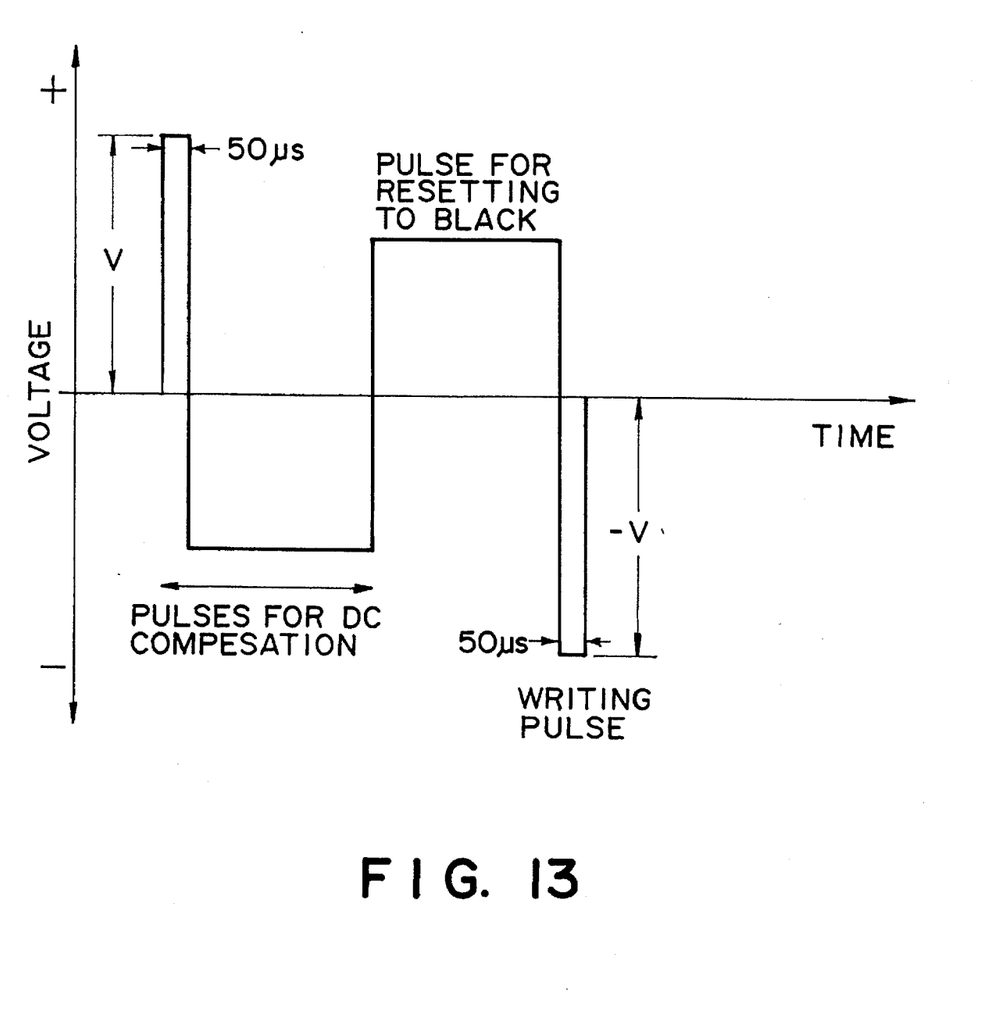
FIG. 13 is a waveform diagram showing a voltage waveform applied to evaluate the transmittance-voltage characteristics.

The above-prepared liquid crystal cell was sandwiched between a pair of 90 degrees-cross nicol polarizers to provide a liquid crystal device and was supplied with a pulse waveform as show in FIG. 13 after being initially placed in a black state and a white state, respectively for 33 msec (one frame period for television), while changing the peak value V (volts) of the writing pulse with a fixed pulse width of 50 μsec, thereby to measure the V-T characteristic of the cell. As a result, the cell showed V-T characteristic curves which were not substantially different from each other between the case of the initially black and the initially white as shown in FIG. 12, thus showing substantially no hysteresis during the drive.

Further, the above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby a tilt angle, a contrast (i.e., a ratio of transmittances between the bright state and the darkest state), and a delay time in optical response leading to after-image were measured. As a result, the transmittance in the darkest state was 0.8% and the transmittance in the brightest state was 46%, thus showing a contrast ratio of 57:1. The delay in optical response leading to an after-image was at most 0.1 sec.

The alignment state of the ferroelectric liquid crystal showed substantially no change even after repeating the switching operations over $10^7$ times.

Further, the cell was continuously supplied with a black reset pulse for one month, and then the threshold value for switching to the bright state was measured. The increase in threshold value (threshold shift) was smaller than measured with respect to a comparative cell prepared by using an alignment film composed of PAn alone.

Figure 11:
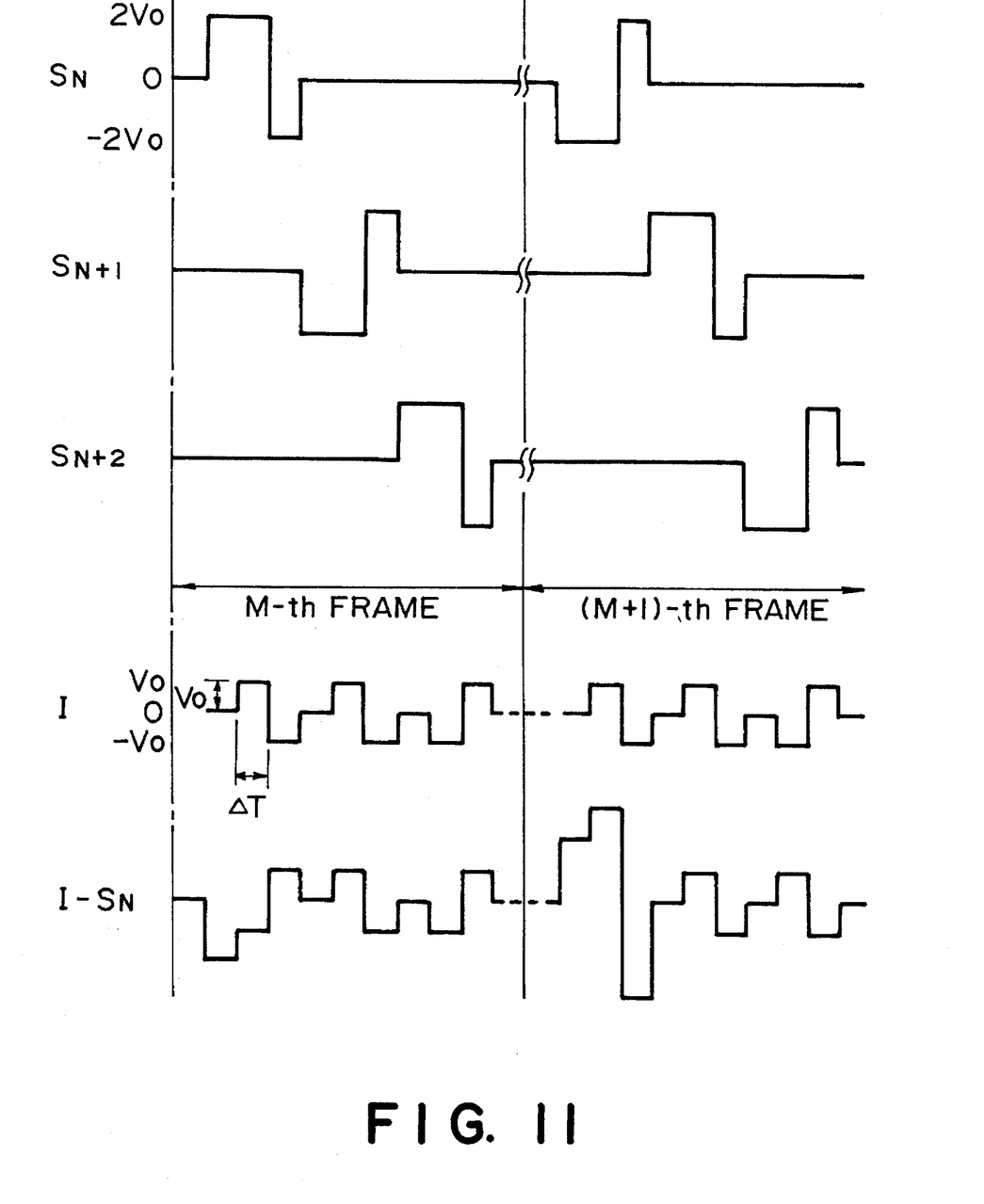
FIG. 11 is a waveform diagram illustrating driving waveforms used in an embodiment of the present invention.

The liquid crystal device of this Example was further subjected to multiplexing drive for display using driving waveforms shown in FIG. 12, whereby a high-quality display with a high contrast was attained. Further, after an image display of a prescribed character image, the whole picture area was erased into "white", whereby no after-image was recognized. Referring to FIG. 11, at $S_N$, $S_{N+1}$ and $S_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_0$=5–8 volts and $\Delta T$=20–70 μsec.

EXAMPLE 2

A biphenyl ester-based ferroelectric liquid crystal material showing the following phase transition series was used instead of the liquid crystal ("CS-1014") used in Example 1 for performing the following experiments.

The ferroelectric liquid crystal material when disposed in a sufficient thickness (ca. 100 μm) in SmC* phase assumed a helical structure having a pitch of ca. 4 μm. The liquid crystal material showed a spontaneous polarization of ca. 10 nC/cm according to the triangular wave method and a tilt angle θ (at a cell thickness=1.5 μm) of 23.5 degrees which is close to the optimum value.

The liquid crystal material was injected into a blank cell which was prepared in the same manner as in Example 1 except that the rubbing was omitted. The cell showed an apparent tilt angle of 16 degrees which was smaller than the optimum value.

The liquid crystal cell was supplied with an AC voltage of 40 Hz and 60 volts, whereby a homogeneous monodomain alignment showing a tilt angle θ of 22.2 degrees appeared. The AC voltage application is considered to have caused an effect of releasing a layer twist as shown in FIG. 5(a). Further, as a result of the AC voltage application, the inversion voltage was increased. The reason has not been clarified as yet but may be attributable to a phenomenon that the approaching of the tilt angle θ to the cone angle Ⓗ caused an increase in inversion voltage for reversing the liquid crystal molecules in the vicinity of the alignment film boundaries, thus inviting an increase in drive voltage. As a result of the increased tilt angle θ after the AC voltage application, the transmittance in the bright state and the contrast ratio were remarkably increased.

When evaluated in the same manner as in Example 1, the cell showed good switching drive characteristics free from hysteresis and showed a remarkably improved contrast compared with the cell of Example 1. As a result of the display by multiplexing drive in the same manner as in Example 1, similarly good results were obtained with respect to contrast and after-image. Further, even after more than $10^7$ times of switching the ferroelectric liquid crystal substantially no change in alignment state was observed. Further, the cell showed a similarly good result as in Example 1 with respect to the threshold shift.

EXAMPLE 3

A ferroelectric liquid crystal material ("FLC6430", available from Roche) showing the following phase transition series was used instead of the biphenyl ester based liquid crystal materials used in Examples 1 and 2 for performing the following experiments.

The liquid crystal material showed a spontaneous polarization of 90 nC/cm², a pitch length of 0.4 μm in SmC* phase and a tilt angle Ⓗ of 27 degrees.

The liquid crystal material in isotropic phase was injected into a blank cell identical to the one in Example 1 and gradually cooled to 30° C. (SmC*) at a rate of 0.5° C./hr. while being supplied with an AC voltage of 15 V/μm and 10 Hz, whereby a homogeneous alignment having a typical short pitch texture was obtained.

The resultant liquid crystal cell was evaluated in the same manner as in Example 1, whereby good switching drive characteristics free from hysteresis were exhibited (FIG. 12). Further, the liquid crystal cell showed a contrast ratio of 60:1 similarly good as in Example 1. Further, as a result of display by multiplexing drive in the same manner as in Example 1, similarly good results were obtained with respect to contrast and after-image.

EXAMPLE 4

A liquid crystal cell was prepared in the same manner as in Example 3 except that the PAn film constituting the lower layer of the alignment film was doped by electrolytic oxidation under application of 0.5 volt n an electrolytic solution of $LiBF_4$/acetonitrile using Ag standard electrodes. The resultant cell was evaluated in the same manner as in Example 3, whereby similarly good switching drive characteristics free from hysteresis were exhibited. Further, the liquid crystal cell showed an improved contrast ratio compared with the cell of Example 3.

EXAMPLES 5–9

Blank cells were prepared in the same manner as in Example 3 except that the electroconductive polymers shown in the following Table 1 were used instead of those used in Example 3, and the resultant cells were filled with the same ferroelectric liquid crystal material ("FLC 6430") as used in Example 3, followed by AC voltage application, whereby the resultant liquid crystal cells showed homogeneous stripe textures. As a result of evaluation in the same manner as in Example 3, the cells showed similarly good switching drive characteristics and contrast ratios.

TABLE 1

| | Alignment film | | | |
|---|---|---|---|---|
| Example | 1st polymer (LC side) | 2nd polymer | Contrast | Hysteresis |
| 5 | PPV | PAn | good | none |
| 6 | PPV | PTN | good | none |
| 7 | PPP | PTN | good | none |
| 8 | PPP | PThV | good | none |
| 9 | PPV | PThV | good | none |

PPV: polyphenylenevinylene
PTN: polyisothianaphthene
PThV: polythienylenevinylene As described above, according to the present invention, the following advantageous effects are attained.

(1) An alignment state providing a large tilt angle in a nonhelical chiral smectic phase can be obtained, thus providing a large contrast between the bright and dark states and particularly providing a high quality display with a very large contrast and free from ugly after-image in multiplexing drive.

(2) In contrast with a conventional knowledge that a ferroelectric liquid crystal showing a large spontaneous polarization is liable to invite an inferior drive characteristic due to a reverse electric field effect, good drive characteristics free from hysteresis due to the reverse electric field during drive can be obtained. Accordingly, the present invention is effective also to a liquid crystal having a very large spontaneous polarization (Ps=ca. 90 $nC/cm^2$).

(3) It is possible to obtain a liquid crystal alignment state which is not liable to cause alignment disorder due to drive.

(4) It is possible to provide a liquid crystal device with stable drive characteristics and showing little change with time of switching threshold.

As a result, the liquid crystal device of the present invention exhibits a very high display quality and is available from excellent motion picture display.

What is claimed is:

1. A ferroelectric liquid crystal device, comprising: a pair of substrates each having thereon an electrode and an alignment film, and a ferroelectric liquid crystal disposed between the substrates; wherein the alignment film on at least one substrate comprises laminated layers of at least two species of electroconductive polymers having mutually different optical band gaps $Eq^{opt}$.

2. A device according to claim 1, wherein a first layer of electroconductive polymer in the alignment film disposed in contact with the liquid crystal has an $Eq^{opt}$ which is larger than that of a second layer of electroconductive polymer in the alignment film disposed below the first layer.

3. A device according to claim 1, wherein the electroconductive polymers are selected from the group consisting of polypyrrole and derivatives thereof, polythiophene and derivatives thereof, polyaniline and derivatives thereof; polyarylenevinylene and derivatives thereof, polyisothianaphthene, poly(phenylene-2,5-diyl), poly(pyridine-2,5-diyl), poly(2,2'-bipyridine-5,5-diyl), and poly(pyridine-5,2-diyl-thiophene-2,5-diyl).

4. A device according to claim 3, wherein the derivatives of polypyrrole, polythiophene and polyaniline are respectively represented by the following recurring units respectively:

wherein X denotes —COR and R denotes —$C_nH_{2n+1}$ (n=0–12).

5. A device according to claim 1, wherein the ferroelectric liquid crystal has a spontaneous polarization of at least 10 $nC/cm^2$.

6. A device according to claim 1, wherein the ferroelectric liquid crystal sequentially assumes isotropic phase, cholesteric phase, smectic A phase and chiral smectic phase.

7. A device according to claim 6, wherein the ferroelectric liquid crystal has a helical pitch of at least 0.8 μm at a mid temperature in its cholesteric phase range.

8. A device according to claim 1, wherein the ferroelectric liquid crystal has no cholesteric phase on temperature decrease.

9. A device according to claim 1, wherein the ferroelectric liquid crystal has a helical pitch of at most 0.5 μm in its chiral smectic phase.

10. A device according to claim 1, wherein the ferroelectric liquid crystal has been subjected to an AC electric field application treatment.

11. A device according to claim 1, wherein at least one of the alignment films has been subjected to a uniaxial alignment treatment.

12. A device according to claim 11, wherein the uniaxial aligning treatment is rubbing.

13. A device according to claim 1, which is driven by a multiplexing drive scheme.

14. A liquid crystal device, comprising: a pair of substrates each having thereon an electrode and an alignment film, and a liquid crystal disposed between the substrates, said liquid crystal assuming chiral smectic phase and having a spontaneous polarization of at least 10 nC/cm$^2$, wherein the alignment film on at least one substrate comprises laminated layers of at least two species of electroconductive polymers having mutually different optical band gaps $Eq^{opt}$.

15. A device according to claim 14, wherein a first layer of electroconductive polymer in the alignment film disposed in contact with the liquid crystal has an $Eq^{opt}$ which is larger than that of a second layer of electroconductive polymer in the alignment film disposed below the first layer.

16. A device according to claim 14, wherein the electroconductive polymers are selected from the group consisting of polypyrrole and derivatives thereof, polythiophene and derivatives thereof, polyaniline and derivatives thereof; polyarylenevinylene and derivatives thereof, polyisothianaphthene, poly(phenylene-2,5-diyl), poly(pyridine-2,5-diyl), poly(2,2'-bipyridine-5,5-diyl), and poly(pyridine-5,2-diyl-thiophene-2,5-diyl).

17. A device according to claim 16, wherein the derivatives of polypyrrole, polythiophene and polyaniline are respectively represented by the following recurring units, respectively:

, and

, wherein X denotes —COR and R denotes —$C_nH_{2n+1}$ (n=0–12).

18. A device according to claim 14, wherein the ferroelectric liquid crystal sequentially assumes isotropic phase, cholesteric phase, smectic A phase and chiral smectic phase.

19. A device according to claim 18, wherein the ferroelectric liquid crystal has a helical pitch of at least 0.8 μm at a mid temperature in its cholesteric phase range.

20. A device according to claim 14, wherein the ferroelectric liquid crystal has no cholesteric phase on temperature decrease.

21. A device according to claim 14, wherein the ferroelectric liquid crystal has a helical pitch of at most 0.5 μm in its chiral smectic phase.

22. A device according to claim 14, wherein the ferroelectric liquid crystal has been subjected to an AC electric field application treatment.

23. A device according to claim 14, wherein at least one of the alignment films has been subjected to a uniaxial alignment treatment.

24. A device according to claim 23, wherein the uniaxial aligning treatment is rubbing.

25. A device according to claim 14, which is driven by a multiplexing drive scheme.

* * * * *

UNITED STATES PATENT AND TRADEMARK OFFICE
CERTIFICATE OF CORRECTION

PATENT NO. : 5,498,762

DATED : March 12, 1996

INVENTOR(S) : KEN EGUCHI

It is certified that error appears in the above-identified patent and that said Letters Patent is hereby corrected as shown below:

```
    In the drawings:
SHEET 8

Line FIG. 13, "COMPESATION" should read --COMPENSATION--.

COLUMN 2

Line 38, "according" should read --accordingly--.

COLUMN 5

Line 10, "film 13b," should read --films 13b,--.
    Line 12, "derivative" should read --derivatives--.

COLUMN 8

Line 3, "angle H" should read --angle Ⓗ--.
    Line 61, "cone 54." should read --cone 53.--.
```

UNITED STATES PATENT AND TRADEMARK OFFICE
CERTIFICATE OF CORRECTION

PATENT NO. : 5,498,762

DATED : March 12, 1996

INVENTOR(S) : KEN EGUCHI

It is certified that error appears in the above-identified patent and that said Letters Patent is hereby corrected as shown below:

COLUMN 9

Line 15, "Blodget" should read --Blodgett--.
    Line 31, "CLC" should read --$C_{LC}$--.

COLUMN 13

Line 21, "n" should read --in--.

COLUMN 14

Line 13, "from" should read --for--.
    Line 36, "units" should read --units,--.

COLUMN 15

Line 28, "respectively" should be deleted.

Signed and Sealed this

Twentieth Day of August, 1996

Attest:

BRUCE LEHMAN

*Attesting Officer*    *Commissioner of Patents and Trademarks*